(12) United States Patent  (10) Patent No.: US 7,594,440 B2
Wilner                      (45) Date of Patent:    Sep. 29, 2009

(54) HIGHLY SENSITIVE PIEZORESISTIVE ELEMENT

(75) Inventor: Leslie Bruce Wilner, Palo Alto, CA (US)

(73) Assignee: Endevco Corporation, San Juan Capistrano, CA (US)

( * ) Notice: Subject to any disclaimer, the term of this patent is extended or adjusted under 35 U.S.C. 154(b) by 154 days.

(21) Appl. No.: 11/538,909

(22) Filed: Oct. 5, 2006

(65) Prior Publication Data
US 2008/0084269 A1  Apr. 10, 2008

(51) Int. Cl.
*G01L 9/06* (2006.01)
*G01P 15/12* (2006.01)
(52) U.S. Cl. .................... 73/754; 73/721; 73/514.33
(58) Field of Classification Search .............. 73/504.04, 73/504.12, 504.15, 504.16, 504.29, 719–721, 73/725–727, 777, 778, 862.043, 862.044, 73/754
See application file for complete search history.

(56) References Cited

U.S. PATENT DOCUMENTS

| | | | |
|---|---|---|---|
| 4,047,144 A * | 9/1977 | Wong | 338/2 |
| 4,498,229 A | 2/1985 | Wilner | 29/580 |
| 4,689,600 A | 8/1987 | Wilner | |
| 4,737,473 A | 4/1988 | Wilner | 437/154 |
| 5,172,205 A | 12/1992 | French et al. | |
| 5,408,112 A * | 4/1995 | Tai et al. | 257/254 |
| 5,412,986 A | 5/1995 | Beringhause et al. | |
| 5,425,841 A * | 6/1995 | Kurtz et al. | 216/16 |
| 6,931,928 B2 | 8/2005 | Hashimoto et al. | |
| 7,104,130 B2 | 9/2006 | Kenny et al. | |
| 2006/0130596 A1 | 6/2006 | Wilner | |
| 2007/0193353 A1 * | 8/2007 | Kim et al. | 73/514.29 |

OTHER PUBLICATIONS

Suminto, J.T., "A wide frequency range, rugged silicon micro accelerometer with overrange stops," Micro Electro Mechanical Systems, 1996, MEMS '96, Proceedings. 'An Investigation of Micro Structures, Sensors, Actuators, Machines and Systems'. IEEE, The Ninth Annual International Workshop on, pp. 180-185, Feb. 11-15, 1996.*
Holbert, K.E.; Nessel, J.A.; McCready, S.S.; Heger, A.S.; Harlow, T.H., "Response of piezoresistive MEMS accelerometers and pressure transducers to high gamma dose," Nuclear Science, IEEE Transactions on, vol. 50, No. 6, pp. 1852-1859, Dec. 2003.*

* cited by examiner

*Primary Examiner*—Harshad Patel
*Assistant Examiner*—Punam Patel
(74) *Attorney, Agent, or Firm*—Goodwin Procter LLP; Paul Davis

(57) ABSTRACT

A mechanical-to-electrical sensing structure has first and second movable blocks formed in a handle layer. A first hinge is coupled to the first and second movable blocks and configured to resist loads other than flexing of the first hinge. The first hinge is formed in the handle layer. A first gauge is separated from the first hinge and aligned to provide that a moment tending to rotate one of the first or second blocks relative to the other about the first hinge applies a tensile or compressive force along a length of the first gauge. The first gauge is formed from a device layer with an oxide between the device and handle layers. The sensing structure is made from an SOI wafer, and the first gauge is protected during an etching away of handle material beneath the first gauge by an oxide between the device and handle layers and an etch-resistant oxide or nitride on exterior surfaces of the first gauge.

10 Claims, 5 Drawing Sheets

HIGHLY SENSITIVE PIEZORESISTIVE ELEMENT

BACKGROUND

1. Field of the Invention

This invention relates generally to mechanical-to-electrical sensing structures, and more particularly to mechanical-to-electrical sensing structures with piezoresistive elements protected during an etching away of handle material beneath the piezoresistive elements by an oxide between the device and handle layers and an etch-resistant oxide or nitride on exterior surfaces of the piezoresistive elements.

2. Description of the Related Art

In electromechanical transducers a transducing element is utilized for detecting the relative displacement of two parts and for developing a corresponding electric signal. Generally, such relative displacements have been measured in the past with various kinds of strain gauges. However, these have a tendency to be of considerable weight, some of which are very bulky, some of which are not very sensitive. Those that are have intricate designs which are very expensive.

Force-type sensors or gauges are known which are mounted between two parts between which a force is applied. The gauge is, therefore, strained in an amount which depends upon that force.

As piezoresistive transducers have developed in use over the years, it has become increasingly desirable to have extremely small sensors of high sensitivity and low bulk. However, in order to develop force gauges which are of extremely small size, difficulties arise in the handling thereof for subsequent mounting upon their substrate, once they are developed. They are difficult to handle not only because of their small size, but also because of their fragility.

One of the primary advantages of force transducers lies in the fact that the displacement between the pads at each end thereof produced by relative motion of the two parts to which the pads are attached is concentrated in the "suspended", so to speak, portion of the force gauge which can mechanically amplify the strain being sensed or measured. Furthermore, the resistance change of the element per unit displacement is greatest as the length of the element is reduced. By use of both short gauge lengths and appropriate leverage very large resistance changes may result from very small displacements. This change in resistance is determined by means of electrical current flowing through the element from one pad to the other, and measuring changes in voltage or other electrical properties resulting from changes in resistance. However, when attempts are made to reduce to a smaller size such force gauges, then, as mentioned above, difficulties arise relative to the handling thereof in mounting upon their substrates, as well as other problems which ordinarily arise in handling very small objects.

Strain sensitive elements are provided in the form of force gauges which are derived from the substrate upon which they are subsequently supported in use. That is, the gauges are defined upon the substrate or marked thereon, and subsequently etched right from the material of the substrate. In one form of force gauge, the gauge is etched to allow a small support or mesa underneath, while maintaining the gauge still connected by this minute portion of the substrate to the substrate proper. In its preferred form, the invention is directed to a force gauge which is etched free of its substrate along its length but continuous with it at its ends. Thus, the gauges of the invention are crystallinally continuous with their support.

That is, force gauges of substantially smaller strain volume are produced by defining the gauge in the substrate or in material rigidly bonded to the substrate, and subsequently etching away the immediately adjacent material, leaving the gauge free in space, after the fashion of force gauges of the past, but supported against unwanted cross loads by remote portions of the substrate. Such gauges may have volume as small as $3 \times 10^{-10}$ cubic centimeters of stressed material, as opposed to present commercially available force gauges wherein the strained volume is $5 \times 10^{-7}$ cubic centimeters. Both gauges would typically be strained to one part per thousand. The strain energy is thus a thousand fold less for the smaller gauge.

Gauges on this type typically have dimensions of about 0.6E-4 cm×4E-4 cm×12E-4 cm, 3E-11 cubic cm, 50 ohms.

In one force gauge, a conventional silicon crystal material is selected, and the outline of the gauge is etched on the selected crystal which forms the substrate. An etch is selected which is both anisotropic and doping-selective. Caustic, hydrazine, and pyrocatechol etchants may be selected, depending upon the results desired. They attack silicon rapidly in the [112] direction, moderately rapidly in the [110] direction, and very slowly in the [111] direction. With this invention, the substrate orientation is (110) plane and [111] along the gauge so as to define a groove over which the gauge extends. With such orientation, a groove is produced with walls which are nearly vertical, and with floors that are nearly flat.

The same etchants which are anisotropic are dopant selective, in that they attack very slowly silicon in which a boron concentration is developed which is greater than $5 \times 10^{19/cc}$. In accordance with the process of the invention, the gauge is defined and its terminals are also defined by a planar diffusion or ion implantation through an oxide mask to a boron concentration of roughly $10 \times^{20/cc}$. The boron makes the gauge P-type, while the substrate is N-type. The diffused area is electrically isolated from the substrate by a P-N junction. During the etching procedure which forms the groove, the gauge is exposed to the etchant, but is resistant to it. As will be appreciated, and explained further herein, when the groove is defined over which the gauge extends, a hinge is also defined in the substrate around which one end of the substrate moves relative to the other to develop the strain being monitored by the sensor. Also, the hinge protects the gauge against transverse loads. Not all of the anisotropic etchants are also doping selective. Some of the anisotropic etchants are also doping selective.

It is noted that the gauge material spared by the dopant-selective etch is necessarily highly doped and therefore of low resistively, typically 0.001 ohm-cm. This makes the individual gauges have resistance which is inconveniently low for conventional circuitry. For example, a "sturdy" gauge would have resistance only 13 ohms, and a smallest old-art gauge 50 ohms. Free-standing transducers for the general market are expected to have resistance well over 100 ohms and 1000 ohms is desired. It is necessary, therefore, to set several of these gauges electrically in series, mechanically in parallel, to achieved an acceptable resistance. Each added gauge needs the same strain energy from the mechanical signal source, so the system sensitivity declines in order to bring its resistance up.

In another force gauge, two substrate wafers are bonded together. Grooves are formed either before or after bonding of the wafers. gauges and their terminals are defined in the gauge wafer by doping them to the requisite high concentration of boron before bonding the wafers, then etching away all of the undoped portion of the gauge wafer. Alternatively, the whole bonded surface of the gate wafer is doped with boron so that the etching leaves a continuous sheet of gauge material from which gauges may be etched by a subsequent photolithographic step.

Once the two wafers are bonded together, with the gauges positioned over their appropriate grooves or apertures which have been defined in the wafers, then the gauges are freed by etching away all of the gauge wafer except the gauges and their terminals.

SUMMARY

An object of the present invention is to provide improved piezoresistive devices, and their methods of manufacture.

Another object of the present invention is to provide piezoresistive devices with improved sensitivities, and their methods of manufacture.

A further object of the present invention is to provide piezoresistive devices, and their methods of manufacture that have self protecting edges.

Yet another object of the present invention is to provide piezoresistive devices, and their methods of manufacture, that have piezoresistive elements protected during an etching away of handle material beneath the piezoresistive elements by an oxide.

These and other objects of the present invention are achieved in a mechanical-to-electrical sensing structure with first and second movable blocks formed in a handle layer. A first hinge is coupled to the first and second movable blocks and configured to resist loads other than flexing of the first hinge. The first hinge is formed in the handle layer. A first piezoresistive element is separated from the first hinge and aligned to provide that a moment tending to rotate one of the first or second blocks relative to the other about the first hinge applies a tensile or compressive force along a length of the first piezoresistive element. The first piezoresistive element is formed from a device layer with an oxide between the device and handle layers. The sensing structure is made from an SOI wafer, and the first piezoresistive element is protected during an etching away of handle material beneath the first piezoresistive element by an oxide between the device and handle layers and an etch-resistant oxide or nitride on exterior surfaces of the first piezoresistive element.

In another embodiment of the present invention, a method is provided of making a mechanical-to-electrical sensing structure. An SOI wafer is used that has a device layer, a handle layer and an oxide barrier. A pattern is outlined of at least one piezoresistive element in the device layer. A protective cover is provided over the device layer to protect from subsequent etching operations. Hinges are sculptured into the handle layer,

DETAILED DESCRIPTION

Figure 1A:
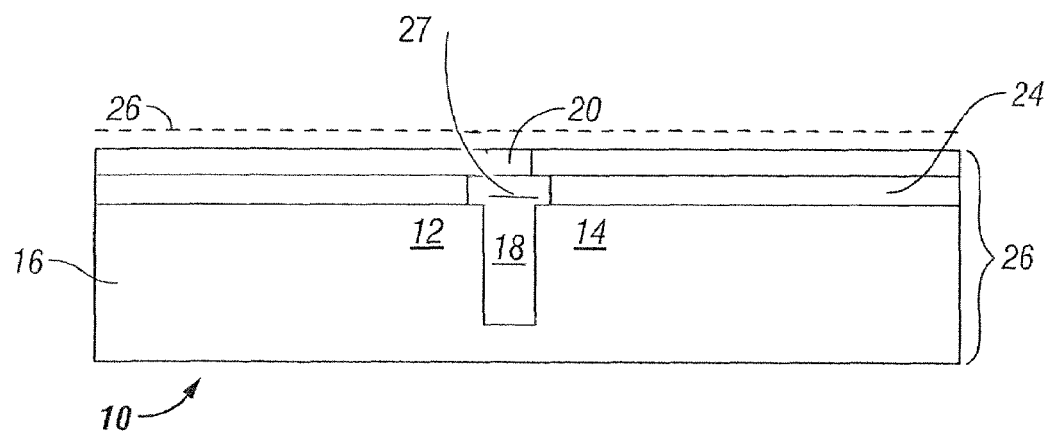
FIG. 1(a) is a perspective view of one embodiment of a mechanical-to-electrical sensing structure, such as a gauge, of the present invention.
Figure 1B:
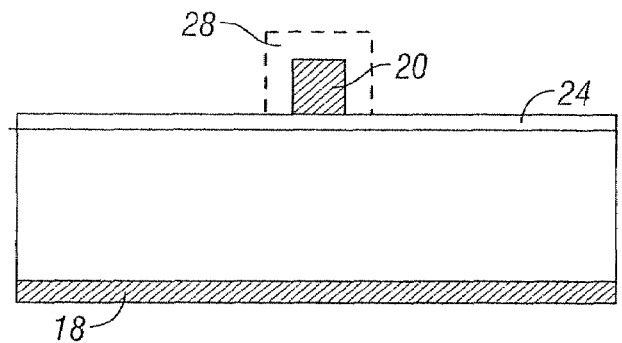
FIG. 1(b) is a cross-sectional view of the FIG. 1(a) mechanical-to-electrical sensing structure.

In one embodiment of the present invention, as illustrated in FIGS. 1(a) and 1(b), a mechanical-to-electrical sensing structure 10 is provided that has first and second movable blocks 12 and 14 formed in a handle layer 16. A first hinge 18 is coupled to the first and second movable blocks 12 and 14 and is configured to resist loads other than flexing of the first hinge 18. The first hinge 18 is formed in the handle layer 16. A first piezoresistive element, or gauge 20 is provided, separated from the first hinge 18 and aligned to provide that a moment tending to rotate one of the first or second blocks 12 and 14 relative to the other about the first hinge 18 and applies a tensile or compressive force along a length of the first gauge 20. The first gauge 20 is formed from a device layer 22 with an oxide layer 24 between the device layer 22 and the handle layer 16.

The sensing structure 10 is made from an SOI wafer, generally denoted as 26. The first gauge 20 is protected during an etching away of handle material beneath the first gauge 20 by an oxide between the device 10 and the handle layer 18 and an etch-resistant oxide or nitride, generally denoted as 28 (FIG. 1(b), on exterior surfaces of the first gauge 20.

By way of illustration and without limitation, in one embodiment of the present invention, gauge 20 has dimensions of: thickness of 3E-4 cm, a width of 8E-4 cm and a length of 32E-4 cm to produce a volume of 1 E-9 cubic cm. In another embodiment the gauge has a thickness of 0.3E-4 cm, a width of 3E-4 cm, a length of 12 E-4 cm to provide a volume of 1E-12 cubic cm.

In one embodiment of the present invention, all of the oxide and etch-resistant oxide or nitride 28 on the exterior surfaces of the first piezoresistive element 20 is removed from the first gauge 20 with substantially only the first gauge 20 carrying the tensile or compressive force. In one embodiment, the first gauge 20 is proportioned to substantially resist buckling to a compressive load that is about equal in magnitude to a tensile strength of the device layer 22. Substantially resist buckling means that the buckling of the gauge 20 should not be the limit to the over-range capability of the structure 10. This means that the compressive stress to cause buckling should be greater than the tensile stress to cause fracture. To substantially resist buckling should have its first mode of failure fracture in simple tension, not buckling from an equal or lesser compressive load. For a well supported silicon column, this requires that the lesser of width and thickness be more than, by way of example, 4% of the length.

The Euler equation for buckling of a fixed-end column is as follows:

$$\text{Critical force } P = \frac{4(pi^2)EA}{(l/r)^\wedge 2}$$

$$\text{Critical Stress} = \text{force/area} = \frac{4(pi^2)E}{(l/r)^\wedge 2}$$

By way of illustration, and without limitation, for a silicon column needing to carry 150,000 psi of compression, the length is no more than 43 times the lesser of width or thickness. In structures with columns at one surface, the columns do not have fully fixed ends and thus the permissible length is less.

In one embodiment, a width and a thickness of the first gauge 20 is greater than about 4% of a length of the first gauge 20. The first gauge 20 can be made of a pre-tensioned material to resist buckling. The pre-tensioned material can be a heavily boron doped silicon material and the like. The pre-tensioned material is sufficiently doped to provide tensioning. The pre-tensioned material can be sufficiently doped to provide tensioning.

Pre-tensioning can be achieved by doping, substituting into the silicon lattice smaller boron atoms, or by mechanical means. The mechanical means bonds together the handle and device layers 20 and 22 and of the SOI wafer 26, while both layers 20 and 22 are bowed out of flat. To leave the device layer 22 surface in tension, its surface should be convex at bonding, while the handle layer 16 surface to which it is bonded is concave.

By way of illustration, the device layer 22 of the SOI wafer 26 can be pre-tensioned by assembling the device layer 22 to the handle layer 16 when both are bowed. Release of the bowing force leaves the device layer 22 stretched by the handle layer 16.

Substitution of an undersize atom into the silicon lattice leaves the doped crystal undersized, and it is dimensionally locked to the substrate. Boron is the best known example of an undersize atom to substitute as an active electrical dopant. The boron leaves the silicon strongly P-type.

In one embodiment, the SOI wafer 26 is initially in tension prior to forming the structure 10. By way of illustration, and without limitation, the SOI wafer 26 can be put in tension by being heavily doped with an undersized atom. The undersized atom can be boron and the like.

Compressive loading from the structure 10 reduces pre-tension. Tensile loading from the structure 10 increases pre-tension.

In one embodiment, the resistively of the first gauge 20 is about 0.01 to 1.0 ohm-cm. In another embodiment, a doping of the first gauge 20 is about 6E15 to 6E18 boron/cc for p-type silicon. In one specific embodiment, the resistively of the first gauge 20 is about 0.002 to 0.0007 ohm-cm. In one embodiment, a doping of the first gauge 20 is about 6E19 to 2E20 boron/cc for p-type silicon. In another embodiment, the first gauge 20 has a resistance of about 600 ohms to 60,000 ohms. In another embodiment, the first gauge 20 has a resistance of about 400 ohms to 2000 ohms.

The thickness of the oxide layer 24, between the device and handle layers 22 and 16, can be in the range of about 0.1 micron to 2.0 micron. In one embodiment, the device layer 22 has a thickness of about 2 to 10 microns, and more particularly a thickness of about 2 to 5 microns, and still more particularly a thickness of about 3 microns.

In one embodiment, the handle layer 16 has a thickness of about 125 microns to 1 mm. The device and handle layers 22 and 16 can be made of the same material. In one embodiment, the device and handle layers 22 and 16 are made of 6H silicon carbide, and the device layer 22 is oriented (0001).

In one embodiment, the device layer 22 can be silicon, oriented (110) and the first gauge is aligned with the [111] direction of the silicon. In another embodiment, the device layer 22 is silicon, oriented (100) and the first gauge is aligned with the [110] direction.

Figure 2A:
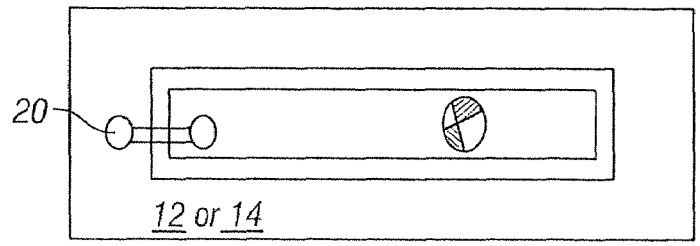
FIG. 2(a) illustrates an embodiment of a mechanical-to-electrical sensing structure of the present invention with the sensitivity going out of the plane of the structure.
Figure 2B:
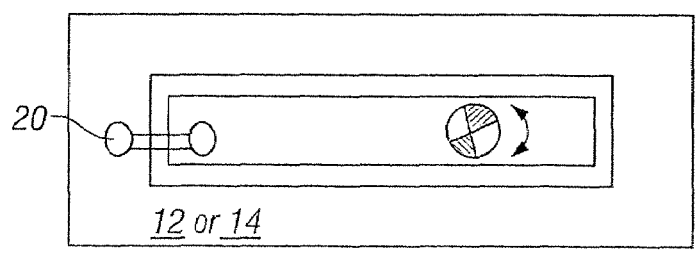
FIGS. 2(b)-2(c) illustrate embodiments of a mechanical-to-electrical sensing structure of the present invention with the sensitivity in the plane of the structure.

In one embodiment, the structure 10 is an acceleration sensor. In this embodiment, one of the first or second movable blocks 12 or 14 is a frame and configured to sense acceleration, and the other first and second movable block 12 and 14 is a seismic mass of the acceleration sensor 10, FIGS. 2(a) and 2(b). In FIG. 2(a) there is sensitivity out of the plane of the structure 10, while in FIG. 2(b) there is sensitivity in the plane of structure 10. The first hinge 18 can extend into a thickness of the SOI wafer 26 to provide that permitted motion of the seismic mass is rotation within a plane of the SOI wafer 26.

The frame, e.g., the first or second movable blocks 12 and 14, can extend around the seismic mass and is closely spaced to an end of the seismic mass in a direction away from the first hinge 18. This limits the motion of the seismic mass and minimizes excessive strain of the first gauge 20. The first hinge 18 can be parallel to a plane of the SOI wafer 26, and spaced away from the device layer 22 to provide that permitted motion of the first hinge 18 is a rotation into and out a plane of the SOI wafer 26.

Figure 2C:
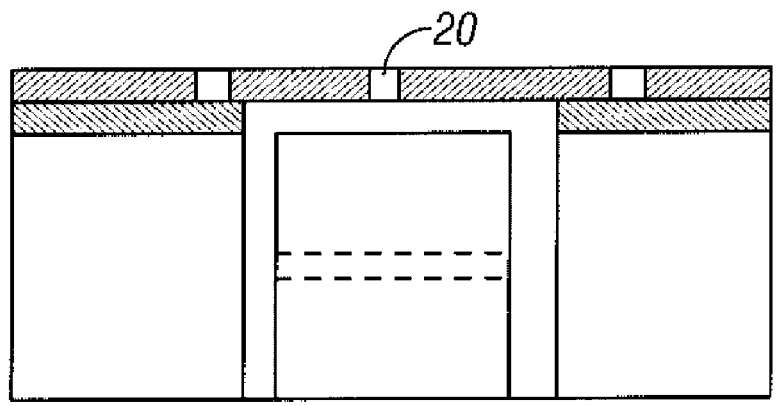

As illustrated in FIG. 2(c), if tabs of the device layer 22 project across the gap separating the seismic mass from the surrounding frame, and the insulating oxide is etched from beneath the tip of the tab, a gap is left equal to the thickness of the oxide barrier 24. The parts may move relative to each other by the space of this gap before being impeded in their movement by the tip of the tab. A tab extending from the seismic mass to the frame impedes motion away from the device layer 22. A tab from the frame to the seismic mass impedes motion toward the device layer 22. If the tabs are sufficiently short, stout, and numerous, they can serve as mechanical stops against excessive motion of the mass.

Figure 3:
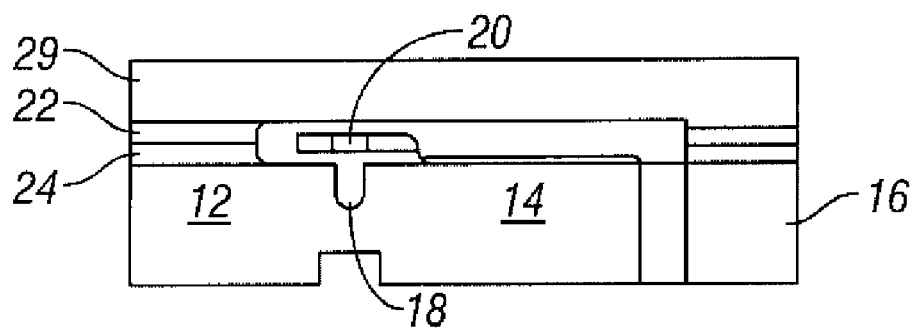
FIG. 3 illustrates another embodiment of a mechanical-to-electrical sensing structure of the present invention with a first additional layer of material parallel to and spaced away from the SOI wafer to limit motion of the seismic mass.
Figure 4:
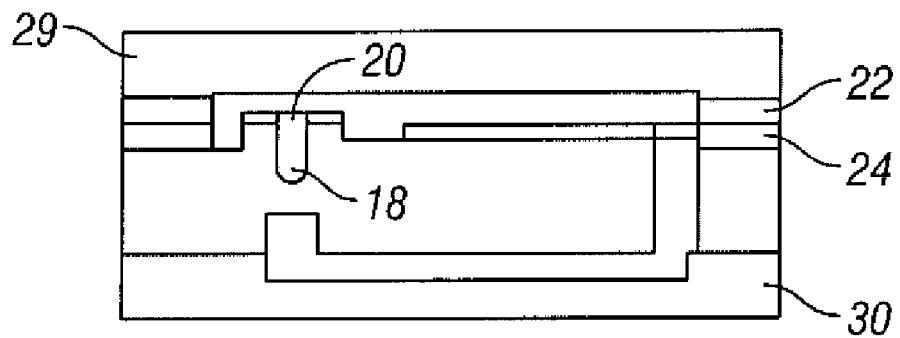
FIG. 4 illustrates another embodiment of a mechanical-to-electrical sensing structure of the present invention, similar to that of FIG. 3 but with a second additional layer.

As shown in FIG. 3, a first additional layer of material 29 is provided and is parallel to and spaced away from the SOI wafer 26 to limit motion of the seismic mass and minimize excessive strain of the first gauge 20. The first additional layer 29 provides a stop for the SOI wafer 26. Upward and downward motion of the seismic mass is substantially stopped in an amount that is about equal to the amount of oxide layer 24 removed between the device and handle layers 22 and 16. The seismic mass can extend under the device layer 22 and the oxide layer 24 between them, and is removed to enable the seismic mass to move toward the device layer 22 by an amount of removed oxide layer 24 before being stopped by the device layer 22. A second additional layer 30 can be included, as shown in FIG. 4. The second additional layer 30 provides a stop for motion of the handle layer 16 against excessive motion in a direction opposite to a direction stopped by the first additional layer 29.

An example of a gauge structure sensor is disclosed in U.S. Pat. No. 4,498,229 incorporated herein by reference.

In another embodiment, the structure 10 is a pressure sensor. When the structure 10 is a pressure sensor, one of the relatively movable blocks 12 or 14 forms a continuous rim which may be sealed to a pressure source. One or more relatively movable blocks 12 or 14 lie within this rim and is sealed to it by a continuous thinned layer derived from the handle layer 16. This thinned layer serves both as "hinge" locally where blocks are adjacent and as a pressure diaphragm for summing pressure into force.

In varying levels of complexity of pressure sensors, we consider rims within which are one interior block and one hinge with gauge, two interior blocks with three hinges among them and the rim, three interior blocks with four hinges, and five interior blocks with eight hinges, and the like.

With two interior blocks, each block is hinged to the rim and the interior ends of the blocks are hinged to each other, generally, between the sides of the blocks, and the rim is a broad expanse of the diaphragm for flexibility. Application of pressure forces the blocks to tilt relative to the rim. Assuming pressure is applied to the side of the structure opposite to the bearing gauges, a gauge between an interior block and the rim will be compressed. The hinge between the two interior blocks will see the sum of the tilts of the two blocks. If blocks are of equal length, the tilt at the central hinge will be twice that at either edge hinge. If the hinge and a gauge are the same length as an edge gauge, it will see twice the level of tension that the edge gauge sees of compression.

The difference of the stress levels can be minimized by making the interior blocks of very unequal length, so the longer block adds little to the tilt of the shorter block. If equality of stress levels is sought, the hinge and gauge between two equal blocks could be twice as long as the gauge and hinge at the edge.

Because electrical connection to interior gauges is difficult, the most easily employed structure is that with three interior blocks and four hinges among them and the rim. If the blocks adjacent to the rim are of equal length, gauges across the four hinges can show equal and opposite strains in response to pressure, which is desirable for linearity in a Wheatstone bridge. Further, the central block can have its motion plane-parallel to the frame. Plane parallel motion permits electrical connection from the central block to the rim via freed links of the same material as the gauges, as described in U.S. Pat. No. 4,737,473 incorporated herein by reference.

Figure 5:
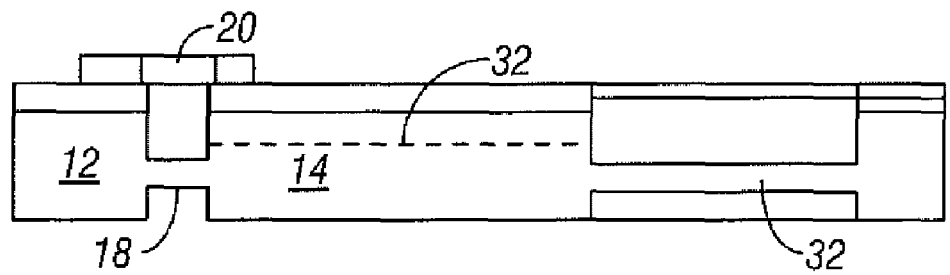
FIG. 5 illustrates one embodiment of the present invention with a rim block of a pressure sensor.

As illustrated in FIG. 5, one of the first or second movable blocks 12 or 14 is a rim block of the pressure sensor 10, and the other movable block 12 or 14 is an inward-extending block that extends in an inward direction away from the rim block 12 or 14. The first hinge 18 is a portion of a diaphragm 32 occupying an area between the rim block 12 or 14 and the inward-extending block 12 or 14.

Figure 6A:
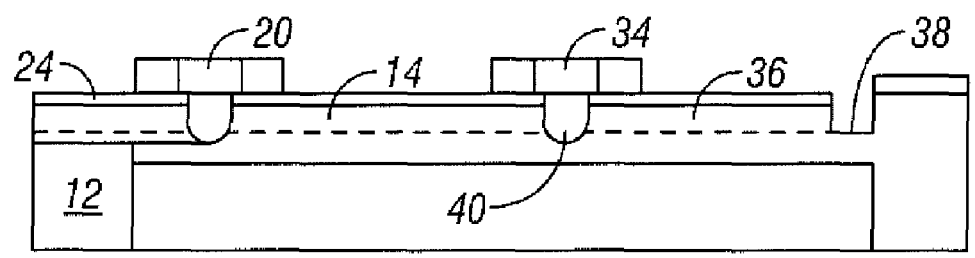
FIG. 6(a) is a sectional view illustrating an embodiment of the present invention with a second gauge, a third movable block and a third hinge.
Figure 6B:
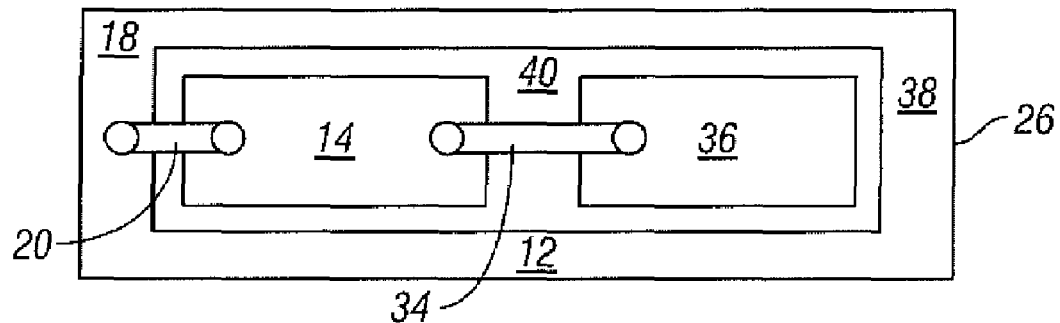
FIG. 6(b) is a top down view of the FIG. 6(a) structure.

In another embodiment, the structure 10 has a second gauge 34, illustrated in FIGS. 6(*a*) and 6(*b*), a third movable block 36 and a second hinge 38 are provided. In this embodiment, the first movable block 12 is a rim block around the pressure sensor 10, the second and third movable blocks 14 and 36 extend inward from the rim block 12 in a direction toward each other to define a third hinge 40 between the second and third movable blocks 14 and 36. The second and third hinges 38 and 40 are portions of the diaphragm 32 that is continuous within the rim block 12 to provide that the first gauge 20, disposed between the rim block 12 and the second block 14, sees compression at substantially a same time that the second gauge 34, between the second block 14 and the third block 36, sees tension.

The rim block 12, second and third movable blocks 14 and 36 can all be aligned in a row from one side of the rim block 12 to the other. The lengths of the blocks 14 and 36 that are adjacent to the rim block 12 can be about equal. The equal lengths provide that under applied pressure the central block moves plane-parallel to the rim block 12. Blocks 14 and 36 adjacent to the rim block 12 tilt equally, and an angular deflection of the second and third hinges 38 and 40 are about equal and opposite to each other.

In this embodiment, the first and second gauges 20 and 34 can have substantially equal and opposite stresses. The second and third hinges 38 and 40 can be substantially linear portions of the diaphragm 32 that is continuous within the rim block 12. The first and second gauges 20 and 34 can be positioned at different sides of the hinge. One of the first or second gauges 20 or 34 can be in tension while the other gauge 20 or 34 is in compression.

In this embodiment, at least first, second and third hinges 18, 38 and 40 are coupled to the first, second and third movable blocks 12, 14 and 36. The first, second and third hinges 18, 38 and 40 resist loads other than flexing of the first and second hinges 38 and 40. The first and second hinges 18 and 38 are formed in the handle layer 16. The third hinge 40 hinges the first and third blocks 12 and 14.

At least first and second gauges 20 and 34 are separated from the first, second and third hinges 18, 38 and 40. The first and second gauges 20 and 34 are aligned in a manner to provide that a moment tending to rotate one of the first, second or third blocks 12, 14 and 36, relative to the other one about the first and second hinges 18 and 38, applies a tensile or compressive force along a length of the first and second gauges 20 and 34. The first and second gauges 20 and 34 are formed from the device layer 22 with the oxide layer 24 between the device and handle layers 22 and 16 respectively. At least one of the first or second gauges 20 or 34 is in tension, and the other gauge 20 or 34 is in compression.

Figure 7A:
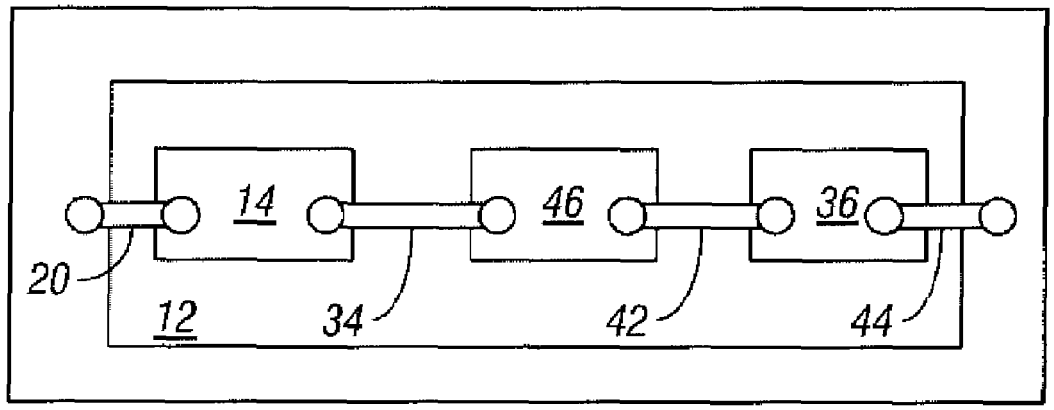
FIG. 7(a) is a sectional view illustrating another embodiment of a mechanical-to-electrical sensing structure of the present invention with a third block and a fourth hinge.
Figure 7B:
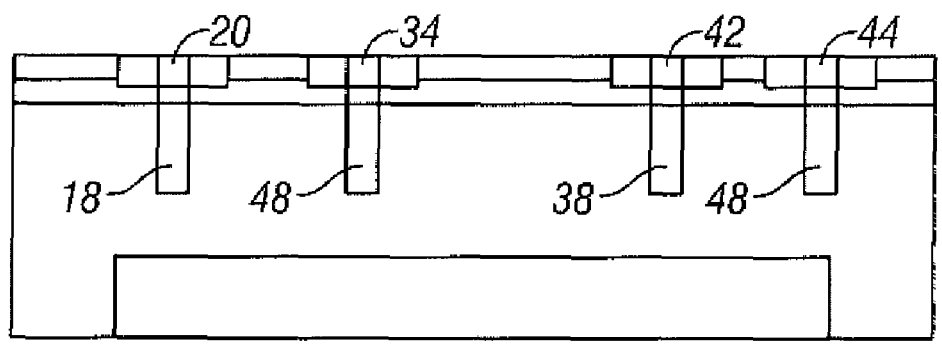
FIG. 7(b) is a top down view of the FIG. 7(a) structure.

As illustrated in FIGS. 7(*a*) and 7(*b*), a third block 46 and a fourth hinge 48 can be provided. In this embodiment, the mechanical-to-electrical sensing structure 10 is again made from the SOI wafer 26. The first and second gauges 20 and 34 are protected, during an etching away of handle material beneath the first and second gauges 20 and 34, by an oxide between the device and handle layers 22 and 16 and the etch-resistant oxide or nitride 28 on exterior surfaces of the first and second gauges 20 and 34.

In one embodiment, the first block 12 is a rim block and the second and third blocks 14 and 36 are tilting blocks. Third and fourth gauges 42 and 44 can be provided. In one embodiment, the strains in all of the gauges 20, 34, 42 and 44 are equal and opposite.

Figure 8:
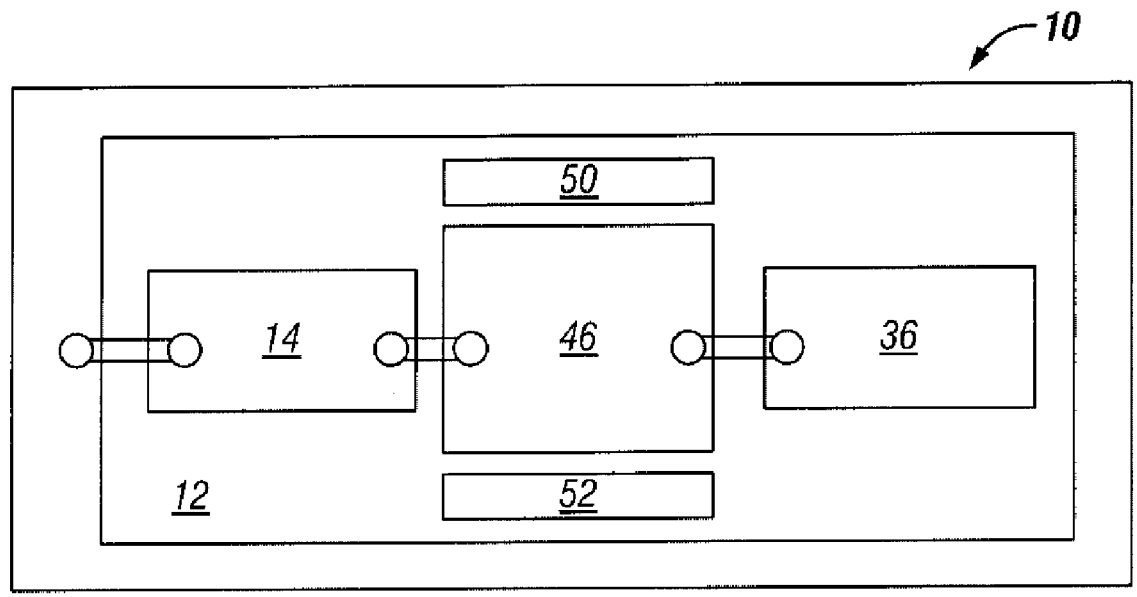
FIG. 8 illustrates another embodiment of a mechanical-to-electrical sensing structure of the present invention with six blocks.

Referring to FIG. 8, the mechanical-to-electrical sensing structure 10 can include fourth, fifth and sixth blocks 46, 50 and 52. In this embodiment, the first block 12 is a rim block. The other five blocks are as follows: one of the blocks is a central block, two of the blocks are tilting measuring blocks, and two of the blocks are tilting non-linearity blocks.

Generally, the structures described above can be formed in a method that provides an SOI wafer 26 that has the device layer 22, the handle layer 16 and an oxide barrier. A pattern is outlined on the SOI wafer 26. The pattern has at least one gauge in the device layer 22. A protective cover is placed over the device layer 22 to protect from subsequent etching operations. Hinges are sculptured in the handle layer 16. In various embodiments, the hinges can extend vertically into the SOI wafer 26, substantially horizontal relative to the SOI wafer, and the like.

Oxide and etch-resistant oxide or nitride is removed from the exterior surfaces of the first piezoresistive element with substantially only the first gauge carrying the tensile or compressive force. Material is removed under the structure using wet chemistry in addition to a deep reactive ion etch dry chemistry.

Figure 9:
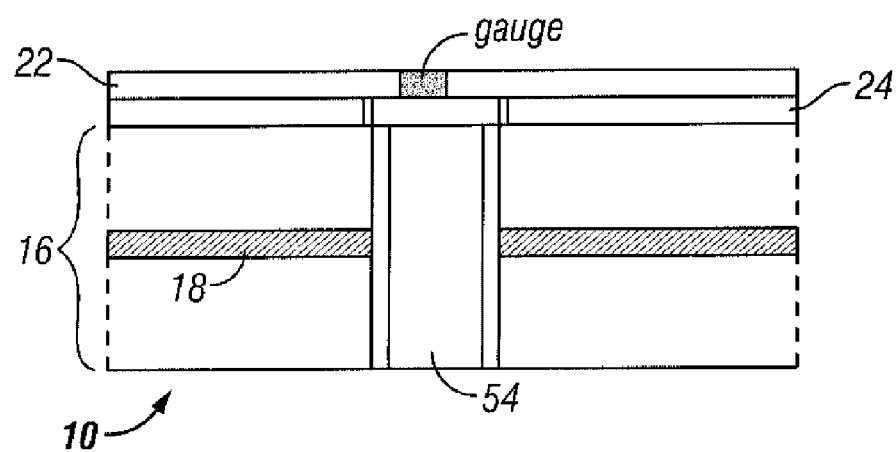
FIG. 9 illustrates another embodiment of a mechanical-to-electrical sensing structure of the present invention with an opening formed below the gauge.

In another embodiment, illustrated in FIG. 9, material is removed from under the gauge 24 and an opening 54 is created. This produces a gauge 20 and hinge 18 with the fewest operations of the gauge 20. The need for an etch protected cover is eliminated. The material under the gauge 20 is completely removed throughout the handle layer 16. The opening 54 is then re-oxidized. The gauge 20 is formed, by patterning, and then an opening through the oxide barrier layer 24 is created to permit plasma etching to the upper surface of the hinge 18. A similar pattern is created on the surface of the handle layer 16 and it is etched to the bottom surface of the hinge 18. The oxide and the oxide barrier layer 24 are then removed, leaving only the gauge 20 and the hinge 16 in the handle layer 18.

The foregoing description of embodiments of the present invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

The invention claimed is:

1. A pressure sensor, comprising:
   first and second movable blocks formed in a handle layer;
   a first hinge coupled to the first and second movable blocks and configured to resist loads other than flexing of the first hinge, the first hinge being formed in the handle layer;
   a first gauge separated from the first hinge and aligned to provide that a moment tending to rotate one of the first or second blocks relative to the other about the first hinge applies a tensile or compressive force along a length of the first gauge, the first gauge being formed from a device layer with an oxide between the device and handle layers;
   wherein the sensing structure is made from an SOI wafer, and the first gauge is protected during an etching away of handle material beneath the first gauge by the oxide between the device and handle layers and an etch-resistant oxide or nitride on exterior surfaces of the first gauge;
   a third movable block;
   a second gauge;
   a second hinge;
   wherein one of the first or second movable blocks is a rim block of the pressure sensor and the other movable block is an inward-extending block that extends in an inward direction away from the rim, the first hinge being a portion of a diaphragm occupying an area between the rim block and the inward-extending block;
   wherein the first movable block is a rim block around the pressure sensor, the second and third movable blocks extend inward from the rim block in a direction toward each other to define a third hinge between the second and third movable blocks, the second and third hinges being portions of a diaphragm that is continuous within the rim block to provide that the first gauge disposed between the rim block and the second block sees compression at substantially a same time that the second gauge between the second block and the third block sees tension.

2. The sensor of claim 1, wherein the rim block the second and third movable blocks are aligned in a row from one side of the rim block to the other.

3. The sensor of claim 2, further comprising:
   a fourth movable block, wherein lengths of the blocks adjacent to the rim block are about equal to provide that under applied pressure one of the movable blocks moves plane-parallel to the rim block, the two blocks adjacent to the rim block tilt equally, and an angular deflection of the second and third hinges are about equal and opposite.

4. The sensor of claim 3, wherein the first and second gauges have substantially equal and opposite stresses.

5. The sensor of claim 4, wherein the second and third hinges are substantially linear portions of the diaphragm that is continuous within the rim block.

6. A mechanical-to-electrical sensing structure, comprising:
   at least first, second and third movable blocks formed in a handle layer, the first movable block being a rim block;
   at least first, second and third hinges coupled to the first, second and third movable blocks and configured to resist loads other than flexing of the first and second hinges, the first and second hinges being formed in the handle layer, the third hinge hinging the first and third blocks;
   at least first and second gauges separated from the first, second and third hinges and aligned to provide that a moment tending to rotate one of the first, second or third blocks relative to the other about the first and second hinges and apply a tensile or compressive force along a length of the first and second gauges, the first and second gauges being formed from a device layer with an oxide layer between the device and handle layers, at least one of the first or second gauges being in tension and the other in compression; and
   wherein the sensing structure is made from an SOI wafer, and the first and second gauges are protected during an etching away of handle material beneath the first and second gauges by an oxide between the device and handle layers and an etch-resistant oxide or nitride on exterior surfaces of the first and second gauges.

7. The structure of claim 6, wherein the first blocks is a rim block and the second and third blocks are tilting blocks.

8. The structure of claim 6, further comprising:
   a third gauge.

9. The structure of claim 8, further comprising:
   a fourth gauge, wherein strains in the all of the gauges are equal and opposite.

10. The structure of claim 6, further comprising:
    third, fourth, fifth and sixth blocks; and
    a fourth gauge; and
    wherein one of the blocks is a rim block, one of the blocks is a central block, two of the blocks are tilting measuring blocks, and two of the blocks are tilting non-linearity blocks.

* * * * *